United States Patent [19]

Hayashida

[11] Patent Number: 5,196,778
[45] Date of Patent: Mar. 23, 1993

[54] CONTROL APPARATUS SUITABLE FOR USE IN INDUCTION MOTOR

[75] Inventor: Takahiro Hayashida, Nagoya, Japan

[73] Assignee: Mitsubishi Denki Kabushiki Kaisha, Aichi, Japan

[21] Appl. No.: 804,476

[22] Filed: Dec. 9, 1991

Related U.S. Application Data

[63] Continuation of Ser. No. 524,106, May 16, 1990.

[30] Foreign Application Priority Data

Jun. 23, 1989 [JP] Japan .................................. 1-162067

[51] Int. Cl.$^5$ ............................................. H02P 7/26
[52] U.S. Cl. .................... 318/807; 318/802; 318/823
[58] Field of Search ............... 318/610, 611, 619, 800, 318/803, 805, 807–811, 823, 561; 310/90.5

[56] References Cited

U.S. PATENT DOCUMENTS

| 3,904,942 | 9/1975 | Holtz | 318/687 |
| 3,983,468 | 9/1976 | Nabae et al. | 318/803 |
| 4,028,600 | 6/1977 | Blaschke et al. | 318/810 |
| 4,281,276 | 7/1981 | Cutler et al. | 318/803 |
| 4,338,559 | 7/1982 | Blaschke et al. | 318/803 |
| 4,499,413 | 2/1985 | Izosimov et al. | 318/802 |
| 4,713,596 | 12/1987 | Bose | 318/561 |
| 5,027,280 | 6/1991 | Ando et al. | 310/90.5 |

OTHER PUBLICATIONS

J. M. D. Murphy, Thyristor Control of A.C. Motors, Pergamon Press, 1973, pp. 120–122.

Primary Examiner—William M. Shoop, Jr.
Assistant Examiner—John W. Cabeca
Attorney, Agent, or Firm—Rothwell, Figg, Ernst & Kurz

[57] ABSTRACT

A gain change-over switch according to the present invention serves to change over at least one of a current loop gain and a velocity loop gain to a value of the gain greater than that in other modes, in the case where a rotational-position control mode is selected as a control mode of the induction motor out of a rotational-speed control mode and a rotational-position control mode or where the rotational-position control mode is chosen and at the same time, a work mode for driving a work piece to work the same is selected, whereby an induction motor is controlled with high accuracy. Further, an exciting change-over switch according to the present invention serves to select a reinforcement exciting circuit for producing the secondary flux in the induction motor, which is greater than that produced by a weakening variable exciting circuit, only in the case where the rotational-position control mode and in the work mode are selected, thereby to control the induction motor with high accuracy. In other modes, the change-over switch serves to select the weakening variable exciting circuit for variably controlling the excitation-component of the primary current to produce the secondary flux corresponding to a torque component developed by the primary current.

4 Claims, 9 Drawing Sheets

CONTROL APPARATUS SUITABLE FOR USE IN INDUCTION MOTOR

This is a continuation of application Ser. No. 07/524,106, filed May 16, 1990.

BACKGROUND OF THE INVENTION

1. Field of the Invention

The present invention relates to a control apparatus suitable for use in an induction motor, which permits rotational-speed and rotational-position controls.

2. Description of the Prior Art

Figure 1:
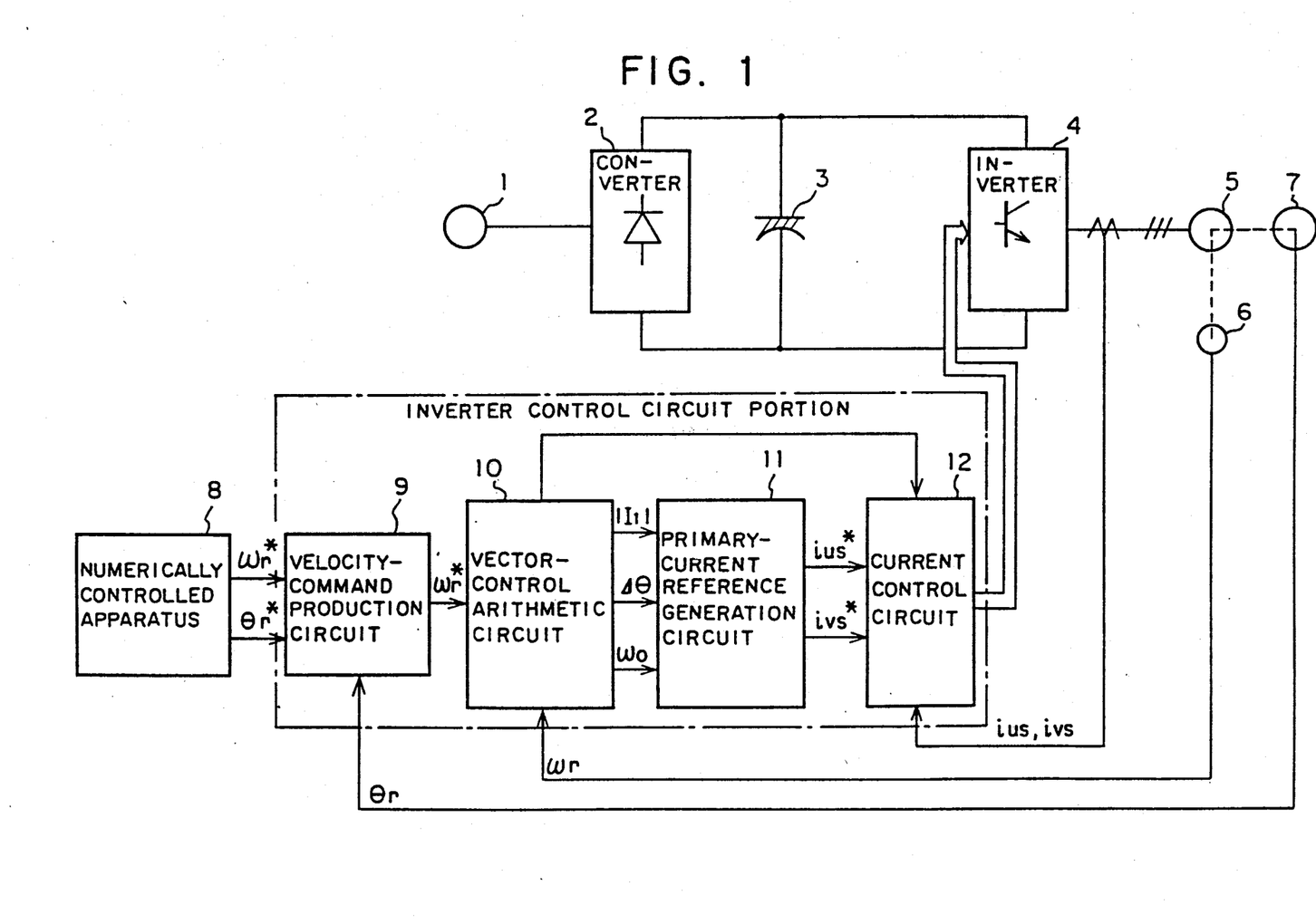
FIG. 1 is a block diagram showing an inverter-drive apparatus suitable for use in an induction motor, which is common to first to third embodiments of this invention and to the prior art.

FIG. 1 is a block diagram showing an inverter-drive apparatus of a vector control type, which is used as a control apparatus for an induction motor. In the drawing, designated at numeral 1 is a three-phase alternating current power supply. Numeral 2 indicates a converter in which diodes or the like are employed, said converter serving to rectify an alternating current delivered from the three-phase alternating current power supply. Numeral 3 denotes a filter capacitor for smoothing out a voltage rectified by the converter 2. Numeral 4 denotes inverter composed of transistors or the like, and which in turn serves to convert a d.c. voltage smoothed by the filter capacitor 3 into a three-phase alternating voltage. Numeral 5 denotes an induction motor (hereinafter called "Electric Motor") which is to be driven by a three-phase alternating voltage outputted from the inverter 4. The electric motor 5 is coupled to a principal axis of an unillustrated machine tool.

Designated at numeral 6 is a velocity detector which is mounted on the electric motor 5 and serves to output a signal corresponding to the rotational speed of the electric motor 5. Numeral 7 indicates a high-resolution position detector which is attached to the electric motor 5 and serves to output a signal corresponding to the rotational position of the electric motor 5.

Numeral 8 indicates a numerically controlled apparatus for outputting a velocity command $\omega^*_r$ or position command $\theta^*_r$. Numeral 9 denotes a velocity-command production circuit which serves to transfer a velocity command delivered from the numerically controlled apparatus 8 as is, during operation of the motor in a rotational-speed control mode. In addition, the velocity-command production circuit also serves to compare a position command $\theta^*_r$ delivered from the numerically controlled apparatus 8 during operation of the motor in rotational-position control mode with a position detection signal $\theta_r$ from the position detector 7 so as to obtain a deviation signal, thereby outputting a velocity command $\omega^*_r$ computed based on the deviation signal. Designated at numeral 10 is a vector-control arithmetic circuit which serves to subject the velocity command $\omega^*_r$ delivered from the velocity-command production circuit 9 and a velocity detection signal $\omega_r$ from the velocity detector 6 to a vector-control computation, to thereby output the amplitude $|I_1|$, the angular velocity $\omega_0$ and a phase angle $\Delta\theta$ of the primary current, which are to be applied to the electric motor 5. Numeral 11 indicates a primary-current reference generation circuit for producing a U-phase primary current command $i^*_{US}$ and a V-phase primary current command $i^*_{VS}$ based on the amplitude $|I_1|$, the angular velocity $\omega_0$ and the phase angle $\Delta\theta$ of the primary current, which are delivered from the vector-control arithmetic circuit 10. Designated at numeral 12 is a current control circuit which serves to compare the primary current commands $i^*_{US}$, $i^*_{VS}$ fed from the primary-current reference generation circuit 11 with feedback signals $i_{US}$, $i_{VS}$ of the primary current, which flow through the electric motor 5 so as to obtain a deviation signal, thereby outputting a signal for controlling an output current of the inverter 4, based on the deviation signal. Incidentally, the control circuit portion for the inverter 4 is composed of the velocity-command production circuit 9, the vector-control arithmetic circuit 10, the primary-current reference generation circuit 11 and the current control circuit 12.

Figure 2:
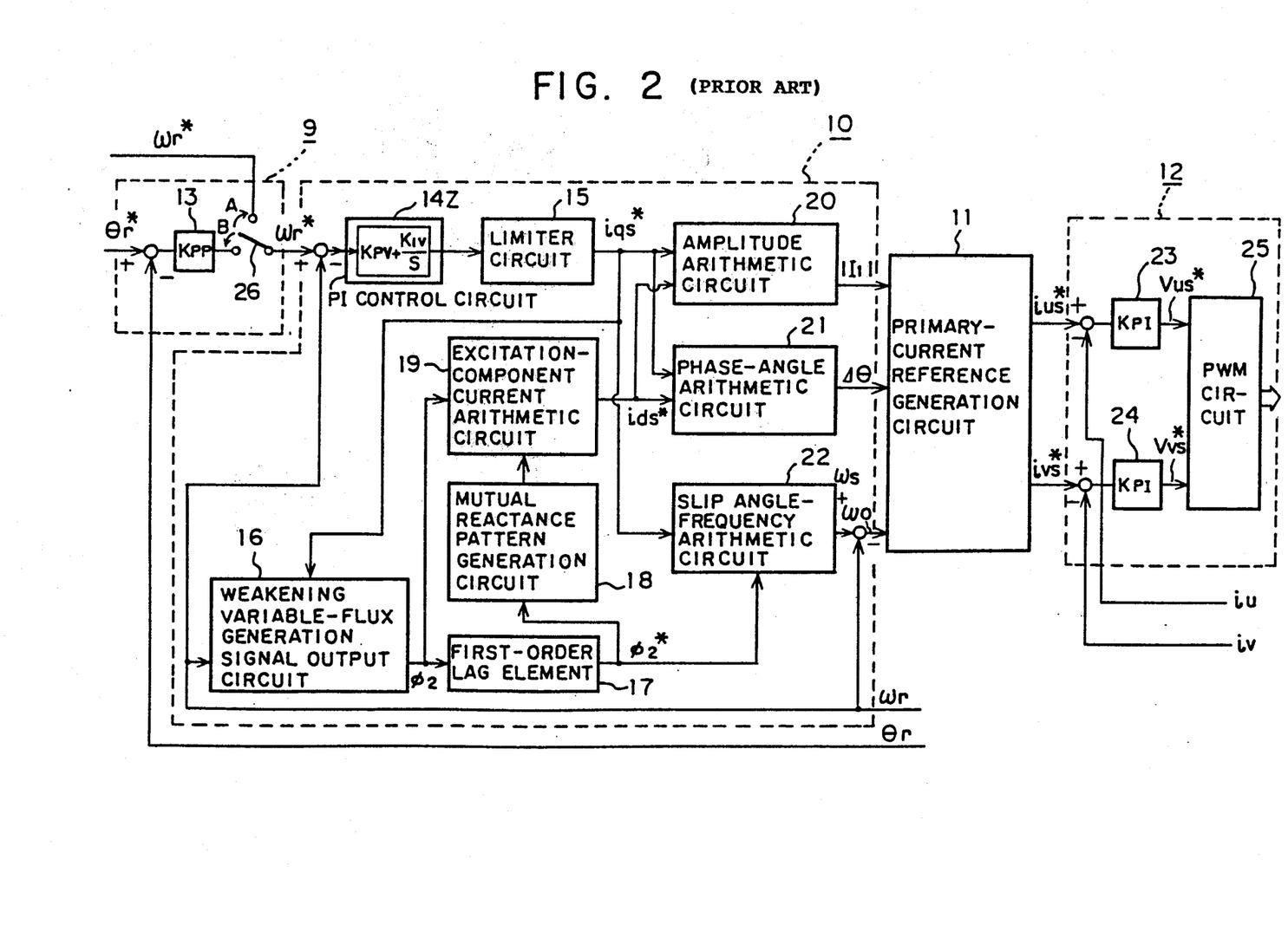
FIG. 2 is a block diagram depicting a vector control circuit portion in a control apparatus suitable for use in the induction motor in accordance with the prior art.

FIG. 2 is a block diagram showing, in detail, the velocity-command production circuit 9, the vector-control arithmetic circuit 10 and the current control circuit 12 depicted in FIG. 1. In the drawing, designated at numeral 13 is a position loop gain circuit for inputting a deviation signal equal to the difference between a position command signal $\theta^*_r$ and a position detection signal $\theta_r$ so as to multiply the same by a position loop gain $K_{PP}$, thereby outputting a velocity command $\omega^*_r$. Numeral 14Z indicates a PI (Proportion/Integral) control circuit as a velocity loop gain circuit, which serves to subject a deviation signal corresponding to the difference between the velocity command $\omega^*_r$ and the velocity detection signal $\omega_r$ to a proportional/integral control computation so as to output the results. Designated at numeral 15 is a limiter circuit which serves to limit an output from the PI control circuit 14Z to a constant saturated value $i^*_{qs}$max so as to be a torque-component current command $i^*_{qs}$. Numeral 16 indicates a weakening variable-flux generation signal output circuit which is operative to output a signal $\phi_2$ corresponding to the secondary flux in conformity with an output $i^*_{qs}$ of the limiter circuit 15 based on the velocity detection signal $\omega_r$. Designated at numeral 17 is a first-order lag element for outputting the secondary flux command $\phi^*_2$ based on the secondary flux generation signal $\phi_2$, and numeral 18 indicates a mutual reactance pattern generation circuit for producing the mutual reactance M for the electric motor from the secondary flux command $\phi^*_2$. Numeral 19 indicates an excitation-component current arithmetic circuit for outputting an excitation-component current command $i^*_{ds}$ based on the secondary flux generation signal $\phi_2$ and the mutual reactance M, and numeral 20 denotes an amplitude arithmetic circuit for computing the amplitude $|I_1|$ of the primary current based on $i^*_{qs}$ and $i^*_{ds}$. Designated at numeral 21 is a phase-angle arithmetic circuit for performing an arithmetical operation of the phase angle $\Delta\theta$ of the primary current based on $i^*_{qs}$ and $i^*_{ds}$, and numeral 22 indicates a slip angle-frequency arithmetic circuit for computing a slip angle frequency $\omega_s$ based on $i^*_{qs}$ and $i^*_{ds}$. Numerals 23 and 24 indicate current loop gain circuits for multiplying the difference between the primary current command $i^*_{US}$ and the primary current detection signal $i_{US}$ and the difference between the primary current command $i^*_{VS}$ and the primary current detection signal $i_{VS}$ by a current loop gain $K_{PI}$, to thereby obtain voltage commands $V^*_{US}$ and $V^*_{VS}$. Designated at numeral 25 is a pulse width modulation circuit (hereinafter called "PWM" circuit) for generating PWM signals for determining the ON and OFF times of each of the transistors of inverter 4 based on $V^*_{US}$ and $V^*_{VS}$. In addition, numeral 26 is a control-mode change-over switch for selecting either of the rotational-speed control mode and the rotational-position control mode.

A description will next be made of the operation of the control apparatus. From a known vector control theory, it follows that $$T_M = P_m \cdot \frac{M}{L_2} \cdot \phi_2 \cdot i_{qs} \quad (1)$$

$$\phi_2 = \frac{M}{\frac{L_2}{R_2} \cdot S + 1} \cdot i_{ds} \quad (2)$$

$$\omega_s = \frac{R_2}{L_2} \cdot M \cdot \frac{i_{qs}}{\phi_2} \quad (3)$$

where
$T_M$ = desired generation torque of induction motor
$P_m$ = number of pole pairs
$R_2$ = secondary resistor
$L_2$ = secondary reactance
$i_{qs}$ = torque-component current
$i_{ds}$ = excitation-component current
S = differential operator Meanwhile, in vector control, a deviation signal corresponding to the difference between the velocity command signal $\omega^*_r$ and the velocity detection signal $\omega_r$ is amplified by the PI control circuit 14Z and a constant limitation is imposed on the amplified signal by the limiter circuit 15, to thereby output the torque-component current command $i^*_{qs}$. In accordance with the formula (2), the excitation-component current arithmetic circuit 19 performs a first-order lag operation of a constant $L_2/R_2$ on signals corresponding to the secondary flux $\phi_2$, which is obtained from the weakening variable-flux generation signal output circuit 16 based on the velocity detection signal $\omega_r$ and the torque-component current command $i^*_{qs}$, and an operation of multiplying the result by the mutual reactance M obtained from the mutual reactance pattern generation circuit 18, thereby obtaining an excitation-component current command $i^*_{ds}$. On the other hand, the slip angle frequency $\omega_s$ can be obtained from the formula (3) by, at the slip angle-frequency arithmetic circuit 22, dividing the torque-component current command $i^*_{qs}$ by the secondary flux command $\phi^*_2$ and then multiplying the result by the coefficient $(R_2/L_2) \cdot M$.

The amplitude $|I_1|$, the angle frequency $\omega_0$ and the phase angle $\Delta\theta$ of the primary current command can be determined by the following equations:

$$|I_1^*| = \sqrt{(i_{qs}^*)^2 + (i_{ds}^*)^2} \quad (4)$$

$$\omega_0 = \omega_r + \omega_s \quad (5)$$

$$\Delta\theta = \tan^{-1}(i_{qs}^*/i_{ds}^*) \quad (6)$$

Accordingly, the arithmetical operation according to the equation (4) is performed in the amplitude arithmetic circuit 20 and that according to the equation (6) is carried out in the phase-angle arithmetic circuit 21.

In the vector control apparatus which has been constructed as described above, the switch 26 is set to the "A" side in FIG. 2 in the normal rotational-speed control of the electric motor 5, i.e., the principal-axis operation mode such that a velocity loop for controlling the rotational speed of the electric motor 5 is formed. In addition, the switch 26 is set to the "B" side in the rotational-position control mode, i.e., the C-axis mode such that a position loop for controlling the rotational position of the electric motor 5 is formed. The response at the time of the C-axis mode is determined by the position loop gain $K_{PP}$ which is to be set in the position loop gain circuit 13 in the velocity-command production circuit 9, and velocity loop proportional and integral gains $K_{PV}$ and $K_{IV}$ which are to be set in the PI control circuit 14Z in the vector-control arithmetic circuit 10. The position loop gain $K_{PP}$ is normally set to a value of 30 sec$^{-1}$ or so. The velocity-loop proportional and integral gains $K_{PV}$ and $K_{IV}$ are set to a larger value wherever practicable, to the extent that the velocity control system is not rendered unstable, without imposing particular limitations on the principal-axis mode and the C-axis mode, to thereby improve the response.

In the control apparatus for use in the conventional induction motor, which has been constructed as described above, the velocity loop gains $K_{PV}$ and $K_{IV}$ are fixed values. Therefore, the velocity response of the vector-control arithmetic circuit 10 at the time of the rotational-speed control mode, i.e., the principal-axis mode is the same as that of the vector-control arithmetic circuit 10 at the time of the rotational-position control mode, i.e., the C-axis mode. It is also necessary to determine the gain in such a way that it is rendered stable at full rotational regions of the motor. Thus, the gain has generally been set to a lower value. In addition, the secondary flux $\phi_2$ of the electric motor 5 is set to about ½ of the rating upon non-load and the excitation-component current $i^*_{ds}$ is set such that the secondary flux becomes gradually greater up to 100% rated flux as the load increases. Accordingly, the velocity response of the vector-control arithmetic circuit 10 at the time of the principal-axis mode is the same as that of the vector-control arithmetic circuit at the time of the C-axis mode.

However, where a machine tool, e.g. an end mill is employed for a C-axis cutting use, an unstable external force is applied to the electric motor 5 owing to blade contacts of cutting tools. If the velocity response of the electric motor 5 is not precise, a change in velocity takes place due to the unstable external force on the motor thereby causing large variations in the difference between an intended command position and an actual position. As a consequence, the accuracy of the C-axis cutting is deteriorated. If the cutting of objects to be cut by the cutting tools is made small with a view toward reducing the variations in the positional errors, the limit capability of the cutting is deteriorated, thereby resulting in reduced applicability of the machinery.

SUMMARY OF THE INVENTION

The present invention has been completed with a view toward solving the foregoing problems. It is therefore an object of this invention to provide a control apparatus suitable for use in an induction motor, which is designed to improve the cutting accuracy at the time of the rotational-position control mode and to enhance the limit capability of the cutting.

With a view toward achieving the above object, according to a first aspect of this invention, there is provided a control apparatus suitable for use in an induction motor, which includes a current loop for performing a feedback control of a primary current of the induction motor, a velocity loop for performing a feedback control of the rotational speed of said induction motor and a position loop for performing a feedback control of the rotational position of said induction motor, said apparatus being adapted to any one of a rotational-speed control mode and a rotational-position control mode by controlling said primary current, comprising:

a gain change-over means for changing over at least one of a current loop gain and a velocity loop gain in said rotational-position control mode to a value greater than that in said rotational-speed control mode.

According to a second aspect of this invention, there is provided a control apparatus suitable for use in an induction motor, which includes a current loop for performing a feedback control of a primary current of the induction motor, a velocity loop for performing a feedback control of the rotational speed of said induction motor and a position loop for performing a feedback control of the rotational position of said induction motor, said apparatus being adapted to any one of a rotational-speed control mode and a rotational-position control mode by controlling said primary current, comprising:

a gain change-over means for changing over at least one of the current loop gain and the velocity loop gain to a value greater than that in other modes, only in the rotational-position control mode and a work mode for working a work piece as an object to be driven by the induction motor.

According to a third aspect of this invention, there is provided a control apparatus suitable for use in an induction motor, said control apparatus being adapted to any one of a rotational-speed control mode and a rotational-position control mode employed in the induction motor by converting the primary current in the induction motor into a torque component and an excitation-component in the selected mode, thereby controlling the induction motor, comprising:

a weakening variable exciting means for controlling the excitation-component of said primary current in such a way that secondary flux in the induction motor can be changed in accordance with the torque component developed by the primary current;

a reinforcement exciting means for controlling the excitation-component of the primary current such that the secondary flux becomes greater than that of the weakening variable exciting means; and an exciting change-over means for selecting the reinforcement exciting means in the rotational-position control mode and a work mode for working a work piece as an object to be driven by the induction motor.

Incidentally, the above and other objects and novel features of the present invention will become more apparent from reading the following detailed description, taken in conjunction with the accompanying drawings. However, the accompanying drawings are merely illustrative of the present invention and by no means limiting the scope of the present invention.

DETAILED DESCRIPTION OF THE PREFERRED EMBODIMENTS

First and second embodiments, and a third embodiment of this invention will hereinafter be described with reference to FIGS. 3 through 6 and FIGS. 7 through 9 respectively. Incidentally, the overall construction of the first to third embodiments is the same as that in the prior art shown in FIG. 1, and its description will therefore be omitted herein.

Figure 3:
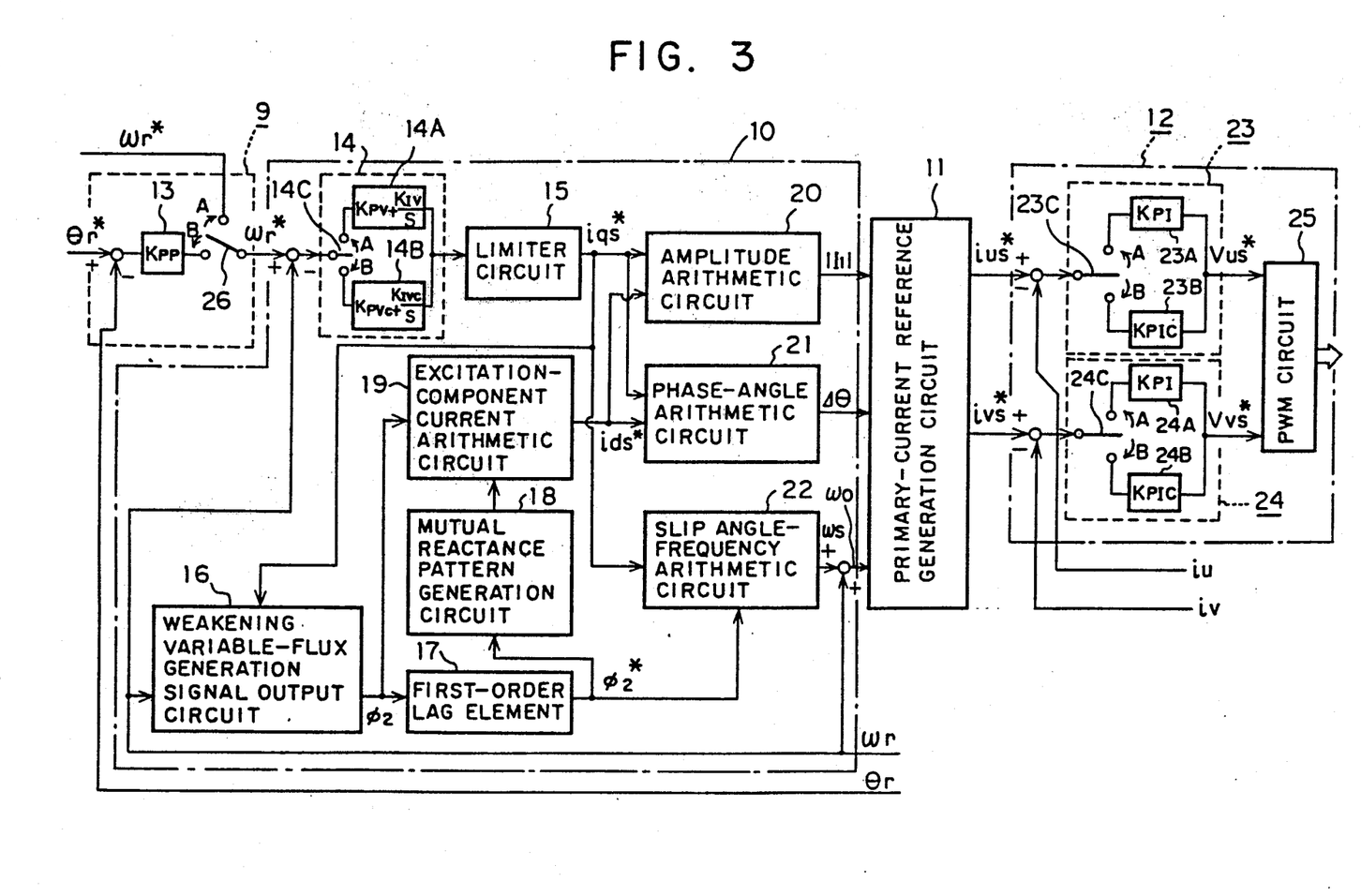
FIG. 3 is a block diagram illustrating a vector control circuit portion in a control apparatus suitable for use in the induction motor according to each of the first and second embodiments of this invention.

FIG. 3 is a block diagram showing a vector control arithmetic circuit portion according to the first embodiment of this invention. The same elements of structure as those in the prior art shown in FIG. 2 are the same as in the prior art or similar to those in the example. In the drawing, designated at numeral 14 is a PI control velocity loop gain circuit for inputting a deviation signal as the difference between a velocity command $\omega^*_r$ and a velocity detection signal $\omega_r$ so as to a proportional-plus-integral operation there upon, to thereby output the results. The PI control circuit 14 is composed of a first PI control circuit 14A having a lower proportional gain $K_{PV}$ and an integral gain $K_{IV}$ as "loop-gain reference values", a second PI control circuit 14B having a higher proportional gain $K_{PVC}$ and a proportional gain $I_{IVC}$ as "high loop-gain", and a velocity gain change-over switch 14C provided to select the first PI control circuit 14A at the time of a principal-axis mode, i.e., rotational-speed control mode of an electric motor 5 or to select the second PI control circuit 14B at the time of a C-axis mode, i.e., rotational-position control mode of the electric motor 5. Designated at numerals 23 and 24 are current loop gain circuits as current-loop control amplifying means for inputting a deviation signal as the difference between a primary current command $i^*_{US}$ and a primary current detection signal $i_{US}$ and a deviation signal as the difference between a primary current command $i^*_{VS}$ and a primary current detection signal $i_{VS}$ so as to perform a proportional control operation there upon, to thereby output associated voltage command $V^*_{US}$ and $V^*_{VS}$. The current loop gain circuits 23 and 24 are composed of first P control circuits 23A and 24A each having a lower proportional gain $K_{PI}$ referred to as "loop gain reference value", second P control circuits 23B and 24B each having a higher proportional gain $K_{PIC}$ referred to as "high loop gain", and current gain change-over switches 23C and 24C provided to select the first P control circuits 23A and 24A at the time of a rotational-speed control mode or to select the second P control circuits 23B and 24B at the time of the rotational-position control mode, respectively. Incidentally, gain change-over means are constructed of the change-over switches 14C, 23C and 24C respectively. Each of the switches is changed over so as to be interlocked with the control mode change-over switch 26 for selecting either one of the rotational-speed control mode "A" and the rotational-position control mode "B".

Figure 4:
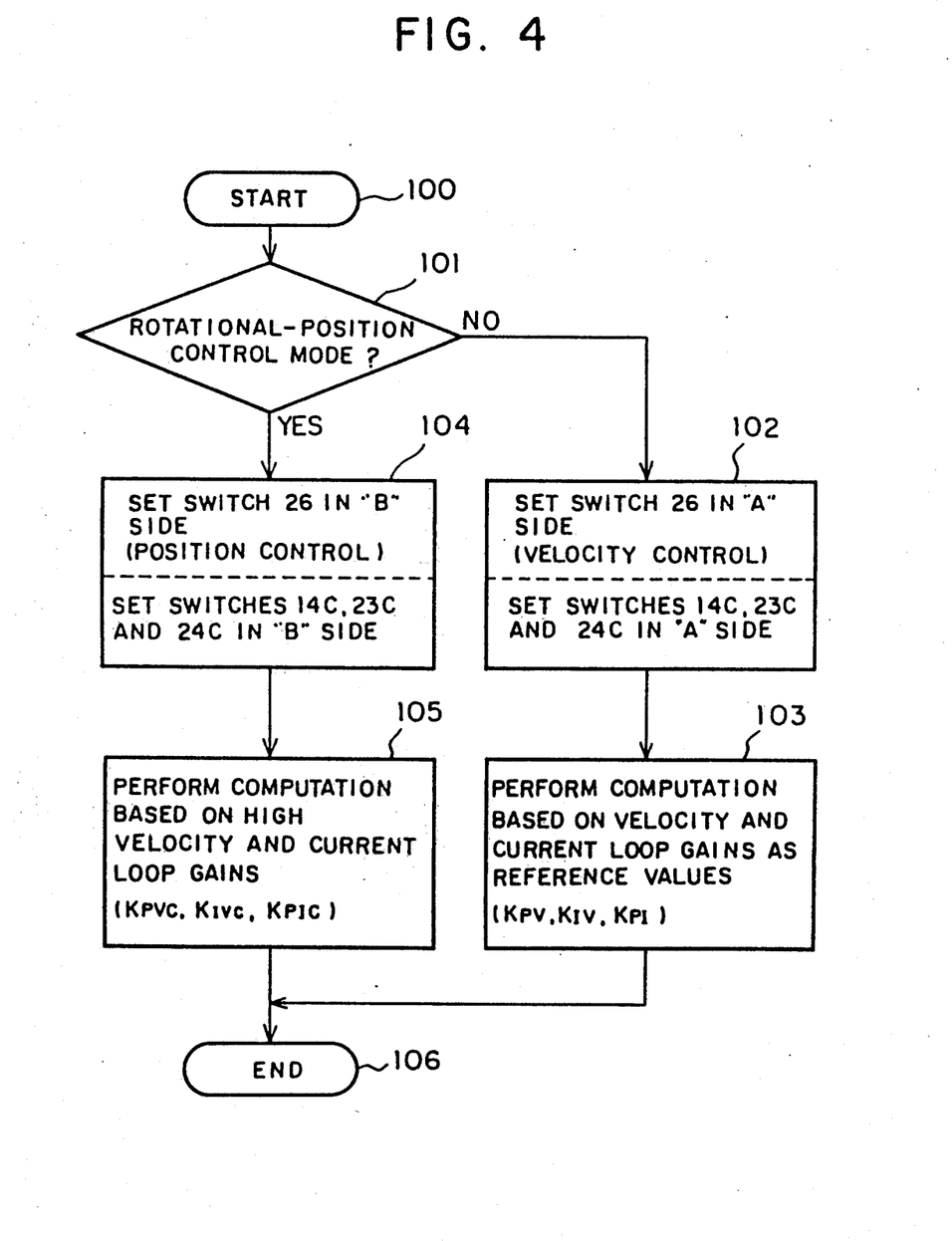
FIG. 4 is a flow chart for describing the operation of the vector control circuit portion according to the first embodiment.

FIG. 4 is a flow chart for describing the operation of the vector control circuit portion 10 shown in FIG. 3. A description will hereinafter be made of its operation with reference to the flow chart.

It is first judged in Step 101 whether the control mode of the electric motor 5 is a principal-axis mode for controlling the rotational speed of the electric motor 5 or a C-axis mode for controlling the rotational-position thereof. When it is judged to be the principal-axis mode, the control mode change-over switch 26, the velocity-gain change-over switch 14C and the current-gain change-over switches 23C, 24C are set in a "A" side in Steps 102 and 103. A velocity loop is selected by the change-over switch 26 and the velocity loop gains $K_{PV}$ and $K_{IV}$ which permit a stable velocity control at full rotational regions of the principal axis are chosen by the switch 14C and the current loop gain $K_{PI}$ is selected by the switches 23C and 24C. On the other hand, when the control mode of the electric motor 5 is taken as the C-axis mode in Step 101, the switch 26 and switches 14C, 23C and 24C are set in a "B" side in Steps 104 and 105. A position loop is selected by the switch 26 and a position loop gain $K_{PP}$ and the velocity loop gains $K_{PV}$ and $K_{IV}$ which permits a stable position control at full rotational regions of the C-axis, are selected by the switch 14C. In addition, the current loop gain $K_{PI}$ is chosen by the switches 23C and 24C.

It is here necessary to make stable the velocity loop at the full rotational regions (for example, 0-6000 rmp) of the principal axis at the time of the normal principal-axis mode. The velocity loop gain is therefore increased. However, a limitation is imposed on such an increase in the gain. On the other hand, since the rotational region is narrow and the rotational speed is low (for example, 0-200 rmp) in the C-axis mode, it is possible to increase the velocity loop gain as compared with that in the principal-axis mode. In addition, it may be feasible to make greater the velocity loop gain by increasing the current loop gain, too.

Incidentally, in the above-described embodiment, a ratio of the proportional gain $K_{PVC}$ (high loop gain) in the second PI control circuit 14B to the proportional gain $K_{PV}$ (loop-gain reference value) in the first PI control circuit 14A and a ratio of the integral gain $K_{IVC}$ (high loop gain) in the circuit 14B to the integral gain $K_{IV}$ (loop-gain reference value) in the circuit 14A, and a ratio of each of the proportional gains $K_{PIC}$ (high loop gains) in the second P control circuits 23B, 24B to the respective proportional gains $K_{PI}$ (loop-gain reference values) in the first P control circuits 23A, 24A are determined by way of example in the following manner:

$K_{PVC} = 5 \; K_{PV}$ $K_{IVC} = 5 \; K_{IV}$ $K_{PIC} = 2 \; K_{PI}$

As a result, this could be available as an effective means for enhancing the velocity response in the control in which the cutting accuracy and capacity are first required as in the C-axis cutting.

Figure 5A:
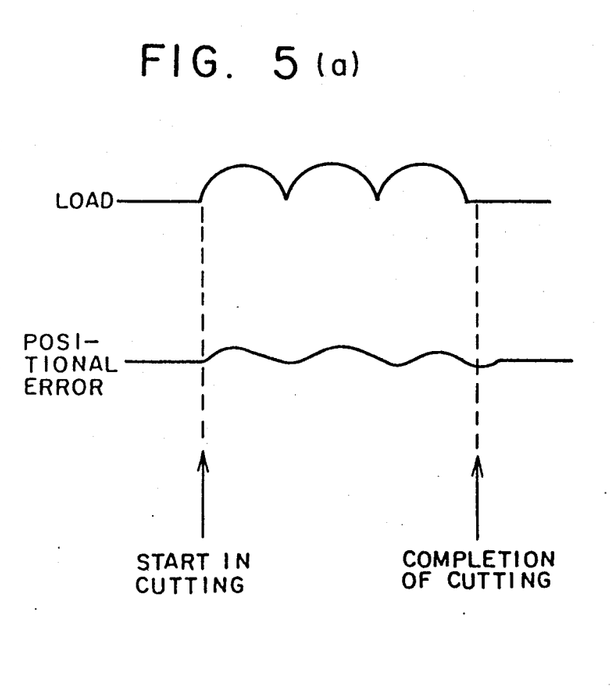
FIGS. 5(a) and 5(b) are graphic representations for comparing a waveform formed by positional errors in the first embodiment with a waveform formed by positional errors in the prior art.
Figure 5B:
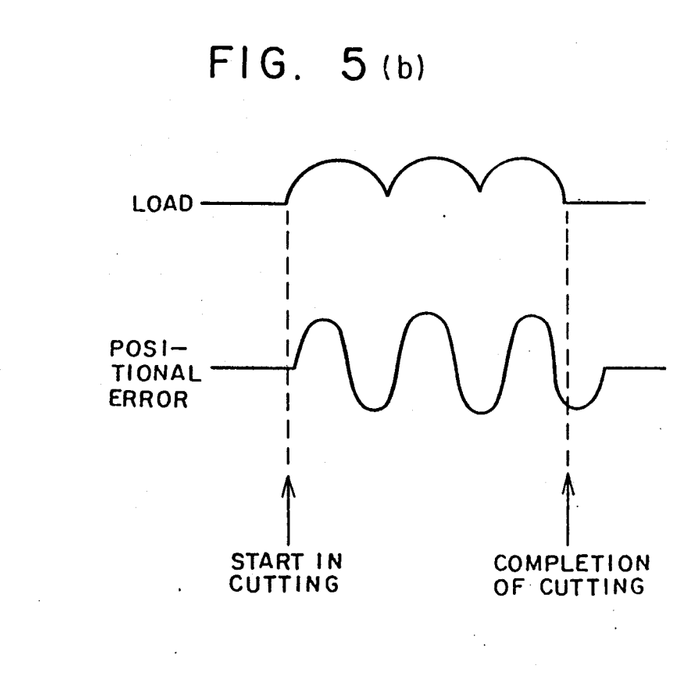

FIG. 5(a) is a graphic representation of the shape of each of waves that indicate a change in a load and variations in positional errors which vary depending on the change in the load, upon performance of the C-axis cutting in accordance with the present embodiment. FIG. 5(b) is a graphic representation of the shape of a wave that indicates, for reference, variations in positional errors upon performance of the C-axis cutting in the same manner as in the prior art.

The change in the load in the case where the C-axis cutting is performed in the present embodiment shown in FIG. 5(a) is the same as that in the prior art depicted in FIG. 5(b). However, the variations in positional errors caused by the change in the load during the cutting operation shown in FIG. 5(a) are extremely smaller than those in FIG. 5(b). Accordingly, the cutting accuracy upon completion of the cutting can significantly improved as compared with that in the prior art.

Figure 6:
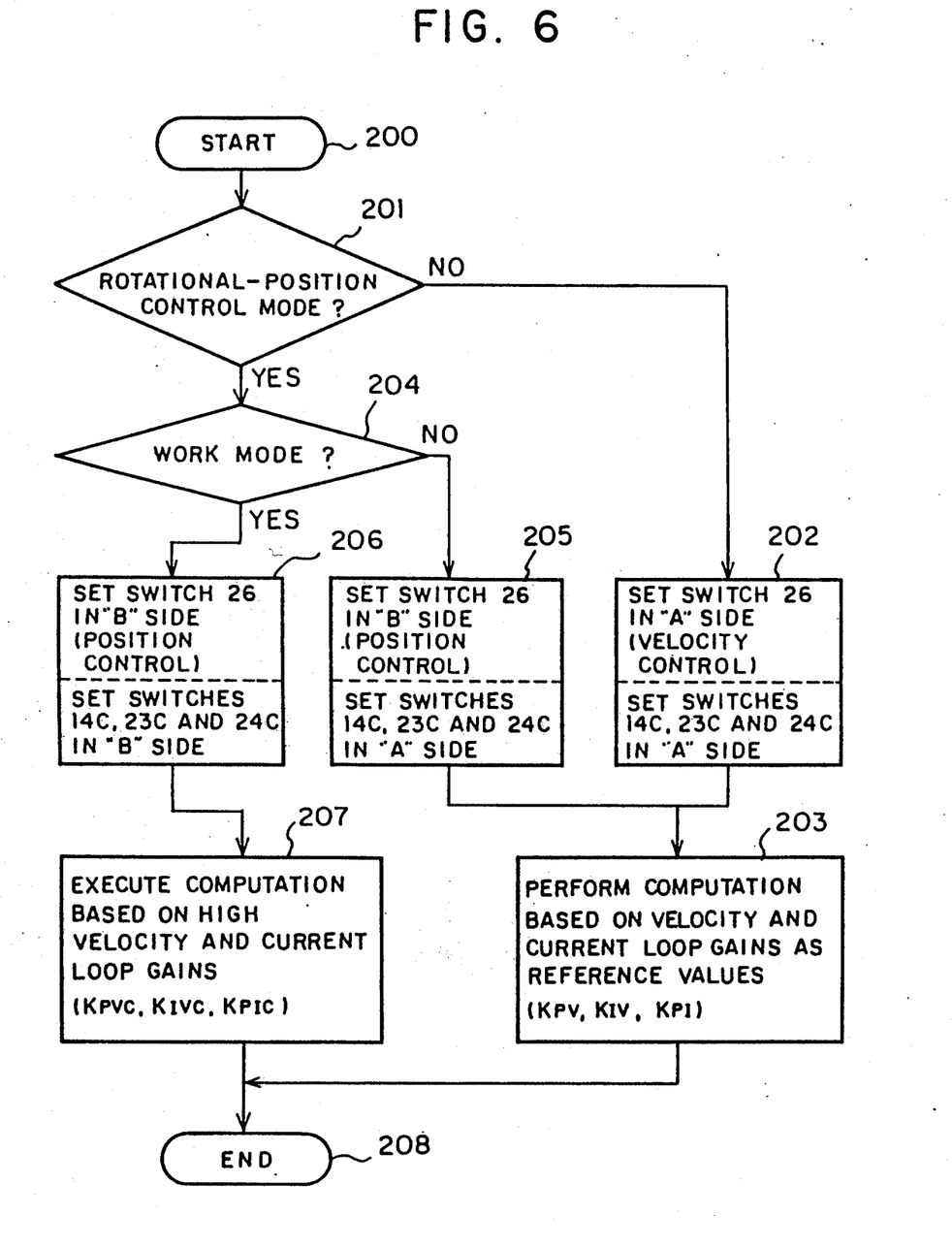
FIG. 6 is a flow chart for describing the operation of the vector control circuit portion according to the second embodiment.

FIG. 6 is a flow chart for describing the operation of a vector control circuit portion according to a second embodiment of this invention. Incidentally, the construction of the control circuit portion according to the present embodiment is the same as that in the first embodiment of this invention. The difference between the first and second embodiments is as follows: The change-over switches 14C and 23C used for changing over the velocity and current loop gains are set in the "B" side, i.e., on the side of the high loop gain in FIG. 3 only in the case where a work mode is selected at the time of the C-axis mode, i.e., the rotational-position control mode of the electric motor 5. In the present embodiment, these switches are changed over to the "A" side, i.e., on the side of the above-described velocity and current loop-gain reference values, in the non-work mode even in the case of the rotational position control mode, thereby making it possible to prevent an increase in vibrational noises caused by making greater the velocity and current loop gains.

A description will hereinafter be made of the operation of the second embodiment of this invention by using the flow chart shown in FIG. 6. In the drawing, it is first performed in Step 201 to judge whether or not the control mode of the electric motor 5 is the C-axis mode for controlling the rotational position. If the judgment is of no, i.e., the principal axis for controlling the velocity, the routine proceeds to Step 202. In step 202, the switch 26 is set in the "A" side as the velocity-control side. In addition, the switches 14C, 23C and 24C are changed over on the side of "A" as the standard loop gain side. A vector operation is hence performed based on the velocity and current loop gain reference values ($K_{PV}$, $K_{IV}$, $K_{PI}$) in Step 203. Where it is judged in Step 201 that the control mode is the C-axis mode, it is judged in Step 204 whether or not the control mode is a work mode. If it is judged to be "no", the routine proceeds to Step 205, where the switch 26 is changed over on the side of "B" as the rotational-position side and the switches 14C, 23C and 24C are also set in the "A" side, i.e., the side of the reference loop gains. The routine in the above Step 203 is thereafter executed. On the other hand, where it is found to be the work mode in Step 204, the routine proceeds to Step 206, where the switch 26 is changed over to the "B" side and the switches 14C, 23C and 24C are also changed over to the "B" side, i.e., the side of the high velocity and current loop gains. A vector operation is hence performed based on the high velocity and current loop gains ($K_{PVC}$, $K_{IVC}$, $K_{PIC}$) in Step 207.

Figure 7:
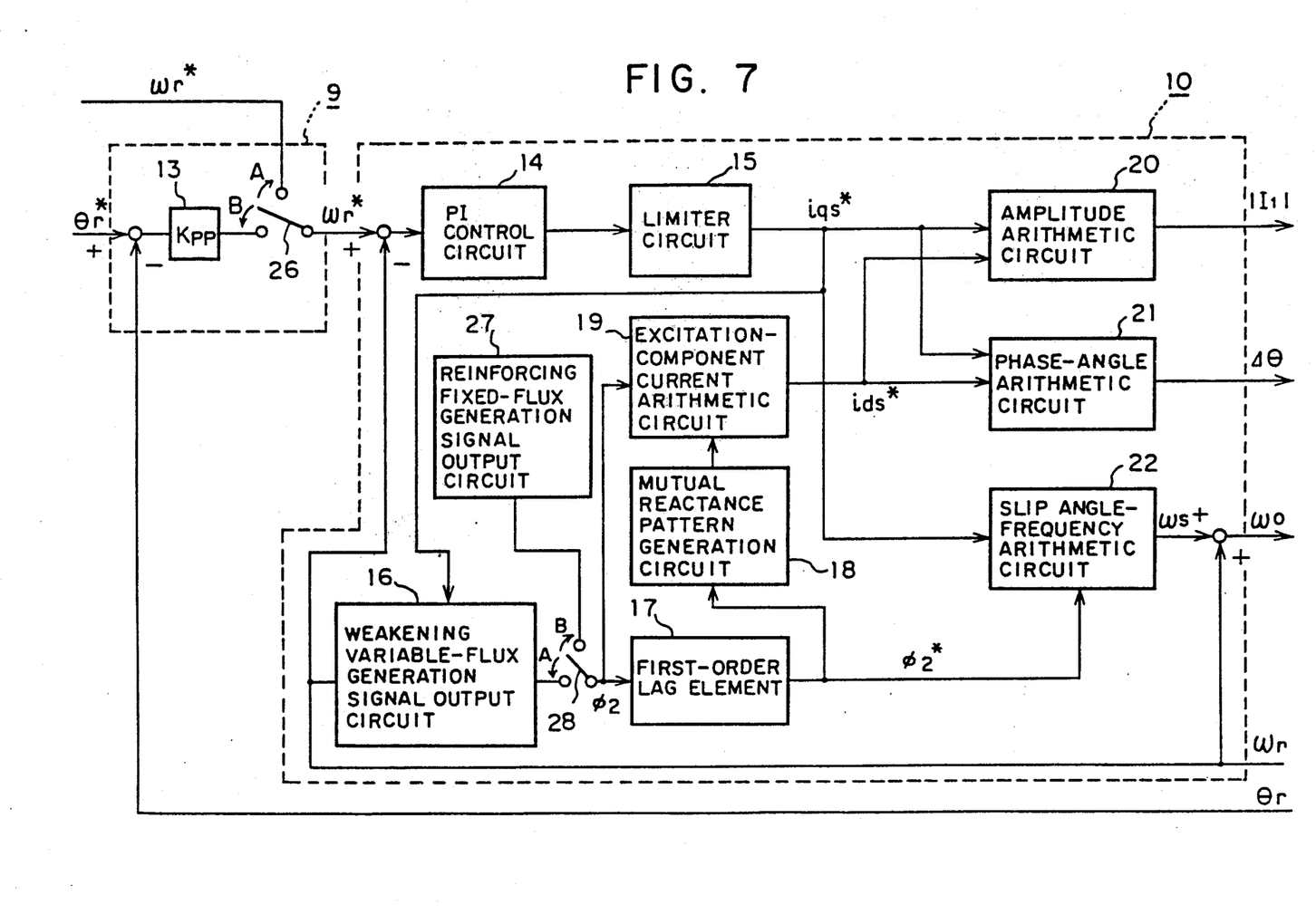
FIG. 7 is a block diagram showing a vector control circuit portion in a control apparatus suitable for use in the induction motor according to the third embodiment of this invention.

FIG. 7 is a block diagram showing a main part of a vector control circuit portion according to the third embodiment of this invention.

In a manner similar to the second embodiment, the third embodiment is designed such that the velocity response at the time of the C-axis cutting is improved at the time of the work mode under the rotational-position control mode of the electric motor 5 and the cutting accuracy of the C-axis is hence enhanced. However, this embodiment is designed to control the secondary flux of the electric motor 5 with a view toward reducing vibrations and noises rather than improving the velocity response at the time of the non-work mode even when the control mode is the C-axis mode.

Referring to FIG. 7, designated at numeral 27 is a reinforcing fixed-flux generation signal output circuit for setting the secondary flux $\phi_2$ of the electric motor 5 to reinforcing fixed-flux with 100% rated flux. Numeral 28 indicates an exciting change-over switch as an exciting change-over means for selecting either one of a weakening variable-flux generation signal output circuit 16 and the reinforcing fixed-flux generation signal output circuit 27 at the time of the C-axis mode in response to an ON or OFF state of a signal-during-C-axis cutting.

Figure 8:
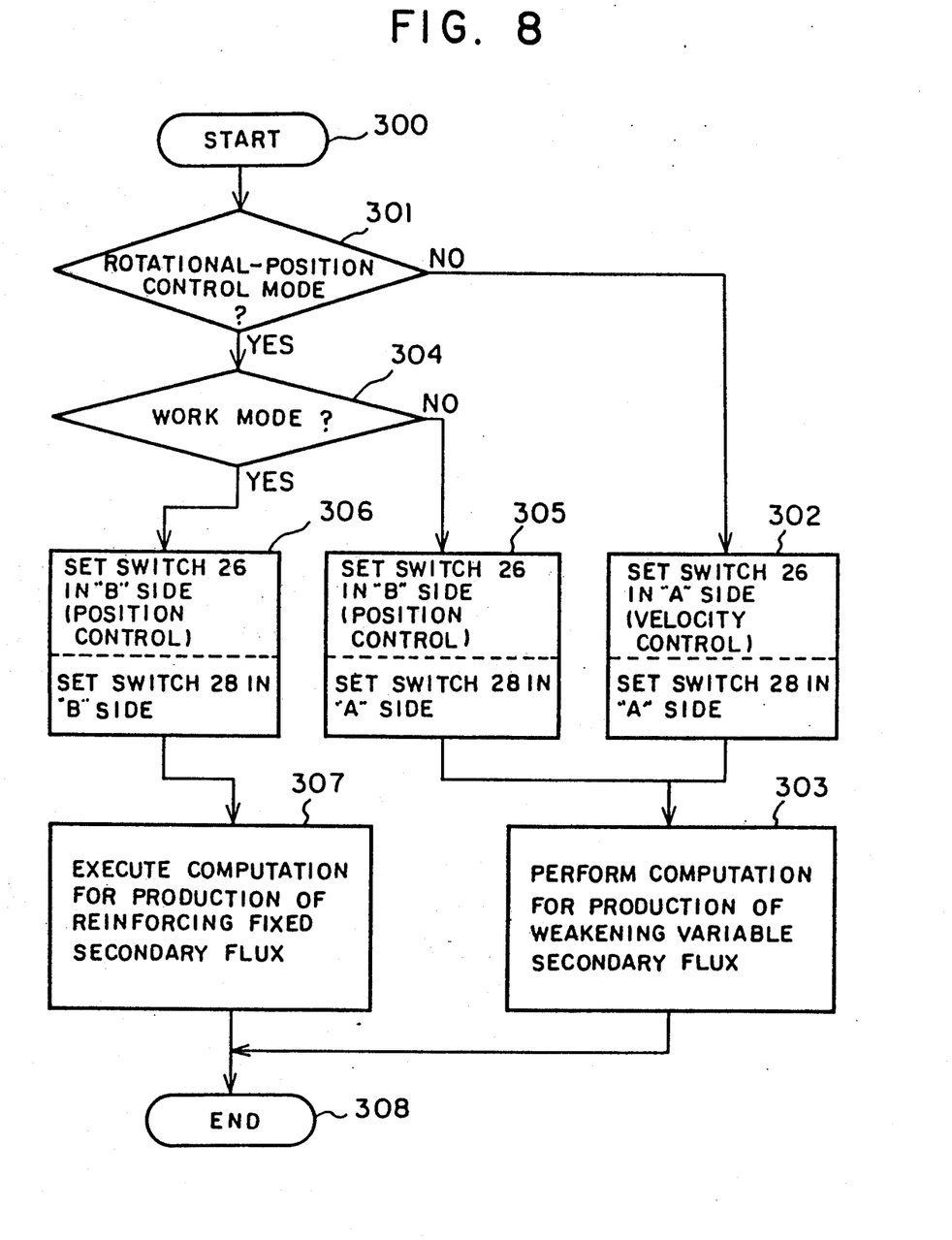
FIG. 8 is a flow chart for describing the operation of the vector control circuit portion according to the third embodiment.

FIG. 8 is a flow chart for describing the operation of the vector control circuit portion shown in FIG. 7. Its operation will hereinafter be described by using the flow chart.

It is first judged in Step 301 whether the control mode of the electric motor 5 is a principal-axis mode for controlling the rotational speed or a C-axis mode for controlling the rotational position. If it is judged to be the principal-axis mode, the routine proceeds to Step 302, where the switches 26 and 28 are set in the position of "A" side. In other words, the velocity loop is selected by the switch 26 and the weakening variable-flux generation signal output circuit 16 as a weakening variable exciting means is chosen by the switch 28. In Step 303, the secondary flux $\phi_2$ of the electric motor 5 is brought into a weakening variable flux, i.e., a substantially 50% of the rating during no-load operation. In addition, the secondary flux $\phi_2$ is controlled such that it gradually becomes greater up to a 100% rated flux as the load increases. A generated signal corresponding to the secondary flux $\phi_2$ is delivered to an excitation-component current arithmetic circuit 19 so as to compute an excitation-component current $i^*_{ds}$. When it is found in Step 301 that the control mode of the electric motor 5 is the C-axis mode for controlling the rotational position, the routine further proceeds to Step 304. It is performed in Step 304 to judge whether the signal-during-C-axis cutting to be inputted from an unillustrated numerically controlled apparatus is an ON or OFF state. If it is an OFF state, the switch 26 is set in the position of "B" side and the switch 28 is set in the "A" side in Step 305. In order to bring the secondary flux $\phi_2$ of the electric motor 5 into a weakening variable flux, the weakening variable-flux generation signal output circuit 16 is selected in Step 303. On the other hand, if it is a YES state in Step 304, the switch 28 is set in the "B" side in Step 306. In addition, the reinforcing fixed-flux generation signal output circuit 27 is chosen so as to bring the secondary flux $\phi_2$ of the electric motor 5 into a reinforcing fixed flux in Step 306. An output signal from the output circuit 27 is inputted to the excitation-component current arithmetic circuit 19 so as to compute an excitation-component current $i^*_{ds}$.

Here, in order to reduce exciting sounds of the electric motor 5, the secondary flux $\phi_2$ of the electric motor 5 is set to a weakening variable flux at the time of the normal principal-axis mode. In addition, in order to reduce exciting sounds and vibrations of the electric motor 5, the secondary flux $\phi_2$ of the electric motor 5 is made to be the weakening variable flux at the time of a normal positioning unnecessary to machine even in the case of the C-axis mode. However, in the control in which the cutting accuracy and capability are first required as in the C-axis cutting, the secondary flux $\phi_2$ of the electric motor 5 is set to be a reinforcing fixed flux in advance so as to enhance the velocity response of a vector control arithmetic circuit 10.

Figure 9A:
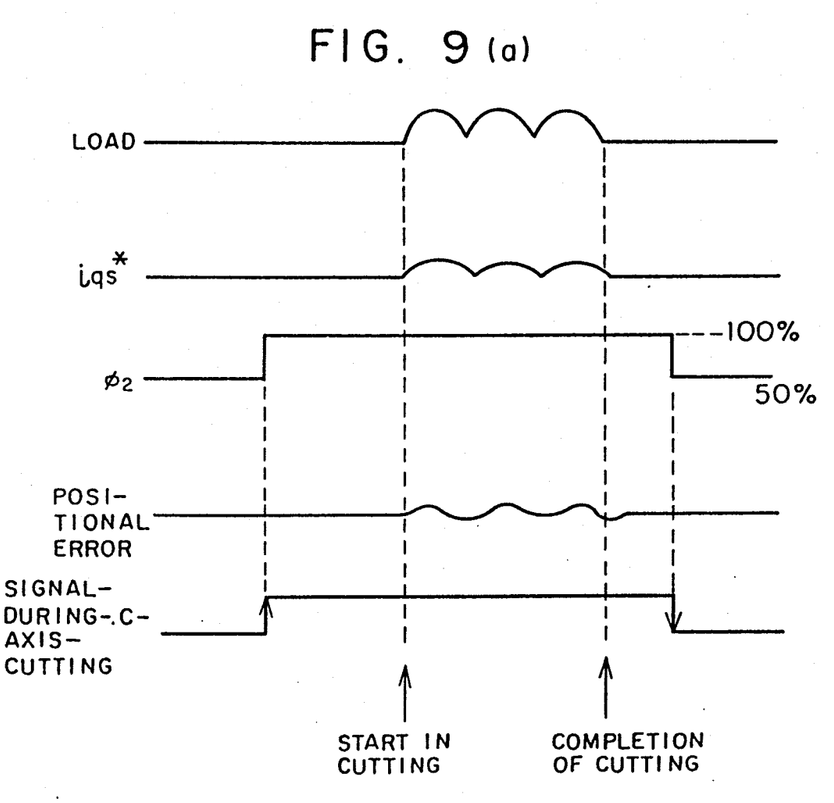
FIGS. 9(a) and 9(b) are graphic representations for comparing a waveform formed by positional errors in the third embodiment with a waveform formed by positional errors in the prior art.
Figure 9B:
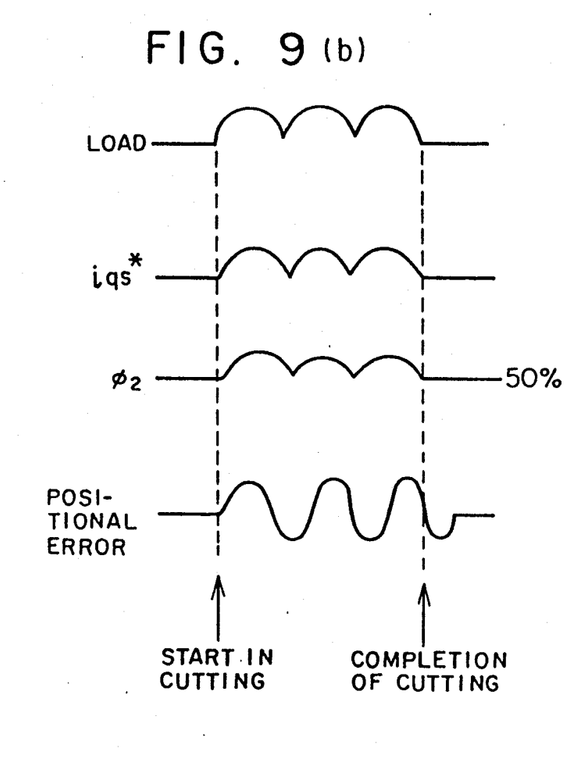

FIG. 9(a) is a graphic representation of the shape of each of waves that indicate a change in a load, a torque-component current command $i^*_{qs}$ and variations in positional errors, which vary depending on the change in the load, upon performance of the C-axis cutting in the case where the secondary flux $\phi_2$ of the electric motor 5 is taken as a 100% rated flux $\phi$, in the present embodiment. FIG. 9(b) is a graphic representation of the shape of a wave that indicates variations in positional errors for the sake of comparison, upon performance of the C-axis cutting in the case where the secondary flux $\phi_2$ of the electric motor 5 is taken as a weakening variable flux $\phi$ which varies from a 50% of the rating to a 100% rated flux.

FIGS. 9(a) and 9(b) illustrate waveforms that indicate the load, the torque-component current command $i^*_{qs}$, the secondary flux $\phi_2$, the positional errors and an input signal representing a state-during-C-axis cutting [which is shown only in FIG. 9(a)] as viewed from above in the drawings. Referring to FIG. 9(a), the secondary flux $\phi_2$ of the electric motor 5 is caused to change from 50% to 100% owing to the input of a signal-during-C-axis cutting in the present embodiment. The change in the load L in FIG. 9(a) is therefore the same as that shown in FIG. 9(b), as compared with the prior art depicted in FIG. 9(b). However, the variations in the positional errors caused by the change in the load L are extremely small. Accordingly, the positional errors and variations in the positional errors can significantly be reduced as compared with the prior art in the same manner as in the first embodiment of this invention. Incidentally, the change in the torque-component current command $i^*_{qs}$ shown in FIG. 9(a) is smaller than that depicted in FIG. 9(b). This reason is as follows. The torque $T_M$ is proportional to the product of the secondary flux $\phi_2$ and the torque-component current $i_{qs}$ in the formula (1) with respect to the torque $T_M$ of the electric motor 5, which has already been described in the prior art. Therefore, the torque-component current $i_{qs}$ becomes small if the secondary flux $\phi_2$ is great, provided that the torque $T_M$ is constant. As a result, as a matter of course, the change in the torque-component current command $i^*_{qs}$ also becomes small.

Each of the above-described first to third embodiments of this invention has illustrated an apparatus constructed by hardware circuits which include the control-mode change-over switch 26 or the like. However, as an alternative, it may be feasible to use software which has been constructed on programs in a microcomputer by using the microcomputer. In this case, the same advantages can be brought about.

Incidentally, in the above-described first embodiment, the velocity and current loop gains have been changed over from the reference value's side of the current loop gain to the high loop-gain side upon changeover from the rotational-speed control mode to the rotational-position control mode. In addition, in the second embodiment, each of the change-over switches used for the velocity and current loop gains has been changed over from the reference value's side of the current loop gain to the high loop-gain side upon changeover from the other modes to the work mode under the rotational-position control mode. Advantageous effects corresponding to those referred to above can however be achieved even in the case where only either one of the switches used for the above-described velocity and current loop gains is selected.

Further, the above-described first to third embodiments have all illustrated the vector control-type inverter control circuits by way of example. They are however not necessarily limited to the vector control-type, provided that a circuit is used of such a type that the rotational position, the rotational speed and the value of a load current in the induction motor are fed back. Advantageous effects corresponding to those referred to above can be obtained even in the use of other type control circuits as an alternative to this type.

According to the first embodiment of this invention, as has been described above, the gain at each of control amplifying means, which are included in the respective current and velocity loops, has been changed over and altered so as to be a greater one in the case of use of the rotational-position control mode in the induction motor than that in the rotational-speed control mode. The present embodiment is hence effective in achieving a control apparatus having high positioning accuracy, as compared with the case of the use of the rotational-speed control mode.

In addition, according to the second embodiment, the gain at each of the control amplifying means, which are included in the current and velocity loops, has been changed over and altered so as to be the greater one, as compared with the other modes, in the case where the rotational-position control mode is selected and the work mode for working work pieces corresponding to objects to be driven by the induction motor is selected, thereby bringing about an effect in achieving a control apparatus which serves to reduce exciting sounds or vibrations of the electric motor 5, in the case where said work pieces are not processed. Likewise, the weakening variable exciting means has been changed over to the reinforcement exciting means in the third embodiment, thereby bringing about an effect in achieving a control apparatus which serves to reduce exciting sounds or vibrations of the electric motor 5, in the case where said work pieces are not processed.

Having now fully described the invention, it will be apparent to one of ordinary skill in the art that many changes and modifications can be made thereto without departing from the spirit or scope of the invention as set forth herein.

What is claimed is:

1. A control apparatus suitable for use in an induction motor in a machine tool drive, which includes a current loop for performing feedback control of the primary current of the induction motor, a velocity loop for performing feedback control of the rotational speed of said induction motor and a position loop for performing a feedback control of the rotational position of said induction motor, said apparatus being adapted to select either one of a rotational-speed control mode and a rotational-position control mode and being adapted to control said primary current of said induction motor in accordance with said selected mode of either said rotational-speed control mode or said rotational-position control mode, said control apparatus comprising:
a gain control change-over means for changing the value of the loop gain of at least one of said current loop and said velocity loop in said rotational-position control mode to a predetermined value of said loop gain greater than the value of said loop gain in said rotational-speed control mode.

2. The control apparatus as claimed in claim 1, wherein said gain change-over means is adapted to change over at least one of said current loop gain and said velocity loop gain to a predetermined value of the gain greater than that in other modes, only in the case where said rotational-position control mode is selected for use together with a work mode for working a piece as an object to be driven by said induction motor in said machine tool drive.

3. A control apparatus suitable for use in an induction motor in a machine tool drive, which includes a weakening variable exciting means for variably controlling an excitation-component of the primary current in said induction motor so as to produce the secondary flux corresponding to the torque component developed by the primary current, in accordance with either one of rotational-speed control mode and a rotational-position control mode, said control apparatus comprising:
a reinforcement exciting means for producing said secondary flux greater than that produced by said weakening variable exciting means; and
an exciting change-over means for selecting said reinforcement exciting means only in the case where said rotational-position control mode is selected for use together with a work mode for working a piece as an object to be driven by said induction motor in said machine tool drive and for selecting said weakening variable exciting means in the case where any of the other modes is selected.

4. The control apparatus as claimed in claim 1, 2 or 3, wherein said control apparatus utilizes a vector control-type control apparatus.

* * * * *

UNITED STATES PATENT AND TRADEMARK OFFICE
CERTIFICATE OF CORRECTION

PATENT NO. : 5,196,778
DATED : March 23, 1993
INVENTOR(S) : Takahiro Hayashida It is certified that error appears in the above-identified patent and that said Letters Patent is hereby corrected as shown below:

On the cover page, under "References Cited", "3,983,468" should be --3,983,463--.

Column 1, line 24, before "inverter" insert --an--;
line 49, before "rotational" insert --a--.

Column 2, line 58, "$V^*_{vs}$" (first occurrence) should be --$V^*_{us}$--.

Column 7, line 61, "KPV" should be --$K_{PV}$--;
line 63, "KIV" should be --$K_{IV}$--;
line 65, "KPI" should be --$K_{PI}$--.

Signed and Sealed this

Fourteenth Day of December, 1993

BRUCE LEHMAN

*Attest:*

*Attesting Officer*    *Commissioner of Patents and Trademarks*